(12) United States Patent
Hanig et al.

(10) Patent No.: US 8,516,769 B2
(45) Date of Patent: Aug. 27, 2013

(54) STIFFENER AND BASE ASSEMBLY FOR A GRAIN BIN

(75) Inventors: John A. Hanig, Sheffield, IA (US); Steven E. Sukup, Clear Lake, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 1717 days.

(21) Appl. No.: 11/308,300

(22) Filed: Mar. 15, 2006

(65) Prior Publication Data

US 2007/0234662 A1    Oct. 11, 2007

(51) Int. Cl.
*E04B 1/38*    (2006.01)

(52) U.S. Cl.
USPC ............................................. 52/715; 248/903

(58) Field of Classification Search
USPC .............................. 52/715, 702, 289; 248/903
See application file for complete search history.

(56) References Cited

U.S. PATENT DOCUMENTS

| | | | | |
|---|---|---|---|---|
| 3,945,741 | A * | 3/1976 | Wendt | 403/191 |
| 3,989,398 | A * | 11/1976 | Wendt | 403/230 |
| 4,587,893 | A | 5/1986 | Brockhaus et al. | |
| 4,589,332 | A | 5/1986 | Brockhaus et al. | |
| 5,625,995 | A * | 5/1997 | Martin | 52/715 |
| 5,632,674 | A | 5/1997 | Miller, Jr. | |
| 5,671,580 | A * | 9/1997 | Chou | 52/656.4 |
| 5,794,395 | A * | 8/1998 | Reed | 52/298 |
| 6,058,668 | A * | 5/2000 | Herren | 52/241 |
| 6,176,053 | B1 * | 1/2001 | St. Germain | 52/232 |
| 6,230,467 | B1 * | 5/2001 | Leek | 52/702 |

OTHER PUBLICATIONS

Behlen, Erection Instructions for 32 M Inside Stiffened Bin, Jul. 1, 1992.
Brock Manufacturing, Construction Manual, Mar. 2002.
Westeel, Centurion W Grain Bins, Printed in Canada, Mar. 2000.
Westeel, Centurion Commercial Storage Systems, Printed in Canada, Nov. 12, 2002.
Chief Storage Systems, Titan CB20 Commercial Bin 42" Sheet Erection Manual, Jul. 23, 2003.
Westeel, Westeel Wide-Corr Commercial Grain Bins, Printed in Canada, Nov. 1995.
Brock Manufacturing, Construction Manual, Jun. 2000.
Brock Manufacturing, Construction Manual, May 2000.
Chief Industries, Inc., Heavy-Duty Drying & Storage Bins, Printed in U.S., 1987.

* cited by examiner

*Primary Examiner* — Gwendolyn Baxter
(74) *Attorney, Agent, or Firm* — Zarley Law Firm, P.L.C.

(57) ABSTRACT

A support for a grain bin having an elongated body with a back surface bent to form support surfaces that extend outwardly from the back surface to form a cavity therein. Connected to the elongated body is a base having a vertical portion and a horizontal portion. The horizontal portion having corners that extend upwardly to form flanges that engage the support surfaces of the elongated body.

10 Claims, 5 Drawing Sheets

STIFFENER AND BASE ASSEMBLY FOR A GRAIN BIN

BACKGROUND OF THE INVENTION

This invention relates to grain bin supports. More specifically, this invention relates to a stiffener and base used to support a grain bin.

In the field of grain bin construction, stiffeners are used in order to support the cylindrical outer wall of a grain bin. Present stiffeners have a base plate that is welded to an elongated member. Due to the length and weight, these stiffeners are awkward and heavy to handle. In addition, welding the base plate to the elongated member creates additional problems. For example, welding two galvanized pieces of metal creates unpleasant and noxious fumes. To overcome this problem, black steel is welded together and then hot-dipped to add a galvanized coating. The hot-dipping process adds costs and time to the manufacture of the stiffeners. Alternatively, the black steel is painted, but over time the paint deteriorates and the steel rusts. Therefore, there is a need in the art for a stiffener and base that addresses these problems.

It is a principal object of the present invention to provide a stiffener and base that is more economical to manufacture.

Another object of the present invention is to provide a stiffener and base that is easy to handle and install.

These and other objects, features, or advantages will become apparent from the specification and the claims.

BRIEF SUMMARY OF THE INVENTION

A support for a grain bin having an elongated body with a back surface bent to form support surfaces that extend outwardly from the back surface to form a cavity therein. Connected to the elongated body is a base having a vertical portion and a horizontal portion. The horizontal portion having corners that extend upwardly to form flanges that engage the support surfaces of the elongated body.

DESCRIPTION OF THE PREFERRED EMBODIMENTS OF THE INVENTION

Figure 1:
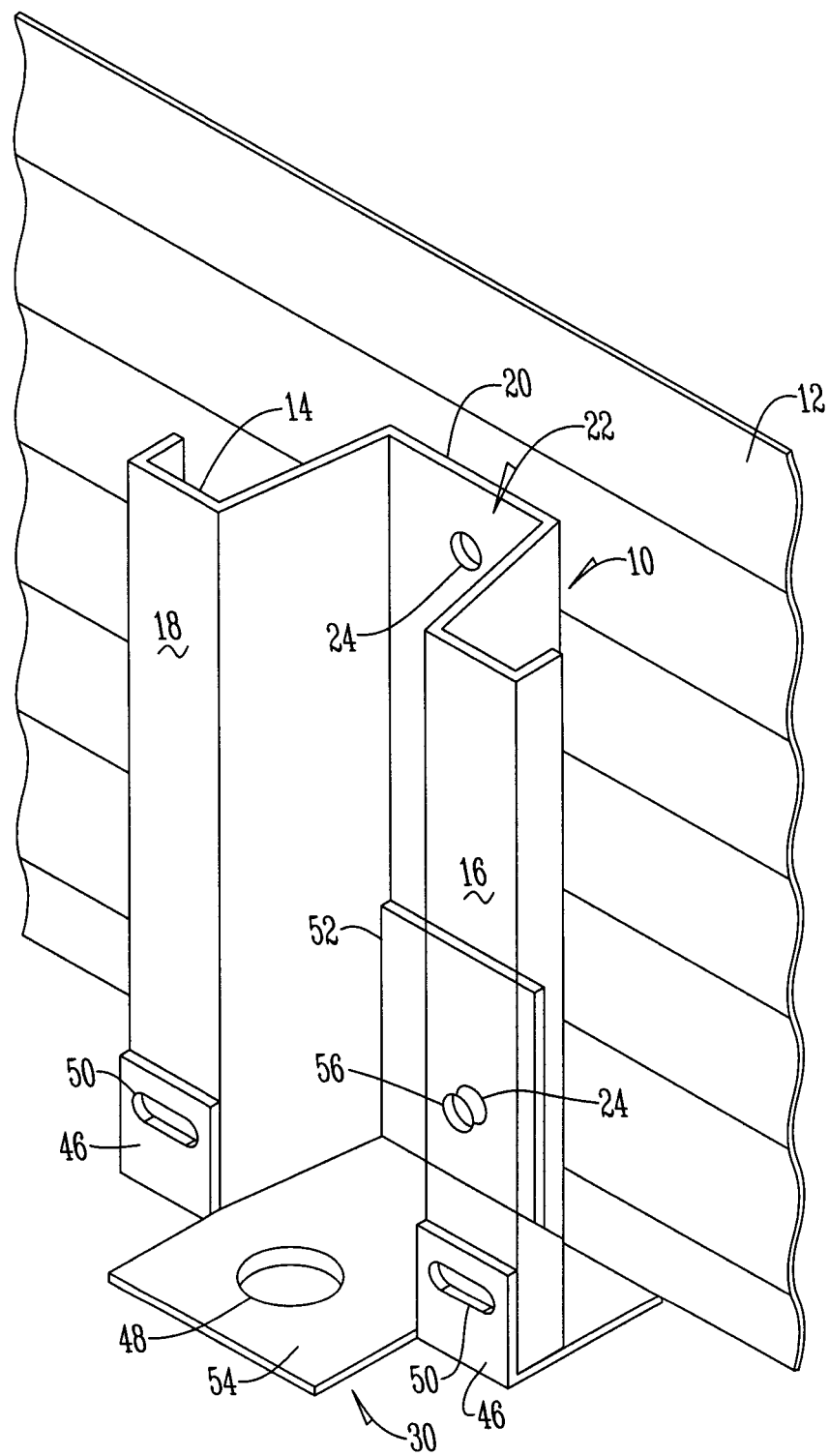
FIG. 1 is perspective view of a stiffener and stiffener base.

Referring to the Figures shown is a stiffener 10 that is attached to a grain bin 12. The stiffener 10 is preferably made of steel and has an elongated body 14 that is bent such that support surfaces 16, 18 extend outwardly from a back surface 20 to form a cavity 22 therebetween as shown in FIG. 1. The back surface 20 has a plurality of apertures 24 that receive a fastener or bolt to secure the stiffener 10 to the grain bin 12.

Figure 4:
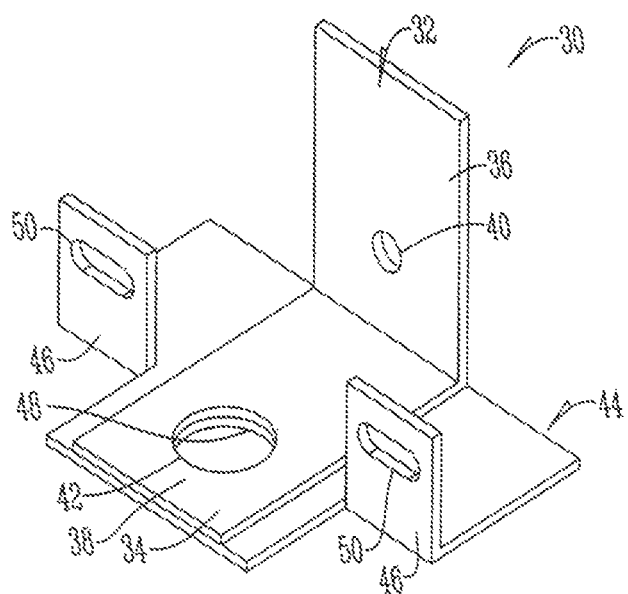
FIG. 4 is a perspective view of a base of a stiffener.

Connected to the elongated body is a base 30. The base as shown in FIG. 4, preferably is made of two pieces. The first section 32 has a plate 34 that is bent generally at a right angle to form a vertical 36 and horizontal 38 portion. The vertical portion 36 has an aperture 40 that aligns with aperture 24. The horizontal portion also has an aperture 42.

First section 32 of the base 30 is placed on second section 44 of the base 30. Second section 44 is preferably a single piece of galvanized steel with corners cut and bent to form upwardly extending flanges 46. The second section 44 has an aperture 48 that aligns with aperture 42. The flanges preferably have slots 50 extending therethrough that receive bolts for connecting the base to surfaces 16 and 18 of body 14.

Figure 2:
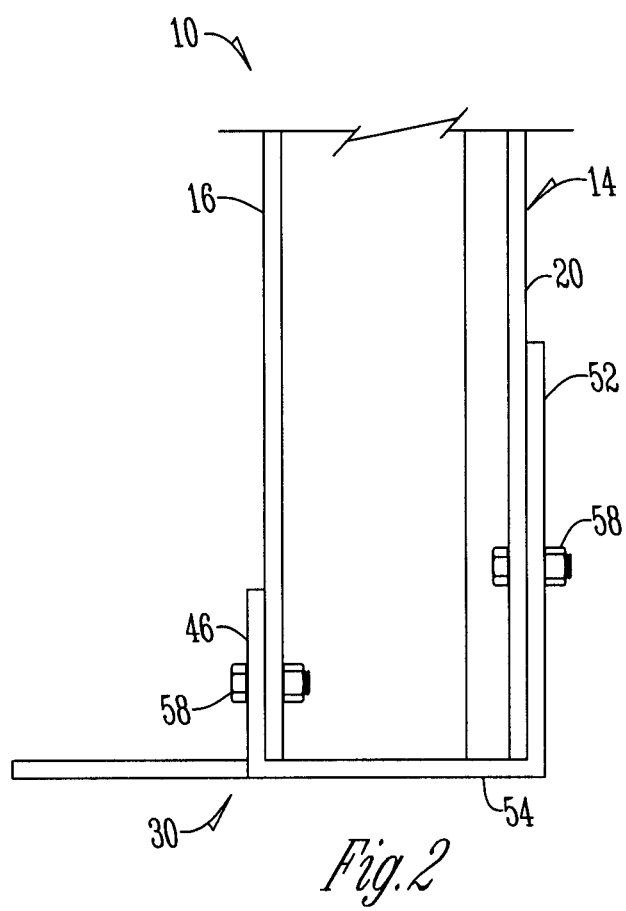
FIG. 2 is a side view of a stiffener and stiffener base.
Figure 3:
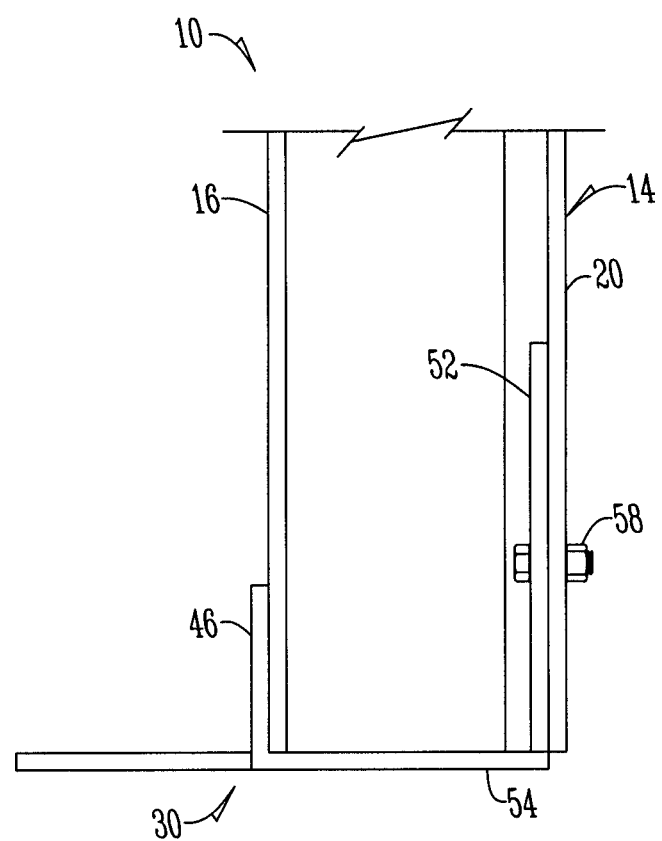
FIG. 3 is a side view of a stiffener and stiffener base.

Alternatively, as shown in FIG. 1, the base 30 is made of a single piece that is bent generally at a right angle to form a vertical portion 52 and a horizontal portion 54. The vertical portion 52 has an aperture 56 that aligns with an aperture 24. The horizontal portion 54 has corners that are cut and bent to form upwardly extending flanges 46 with slots 50 extending therethrough. The horizontal portion 54 also has a centrally located aperture 48. As shown in FIGS. 2 and 3, the base 30, as shown in FIG. 1, may be formed such that the horizontal portion 54 extends underneath the elongated body 14 of the stiffener 10 so that the vertical portion 52 is connected between the back surface 20 of elongated body 14 and the grain bin 12 as shown in FIG. 2. The base 30, as shown in FIG. 3 may also be formed such that vertical portion 52 fits within cavity 22 and is connected to back surface 20.

Figure 5:
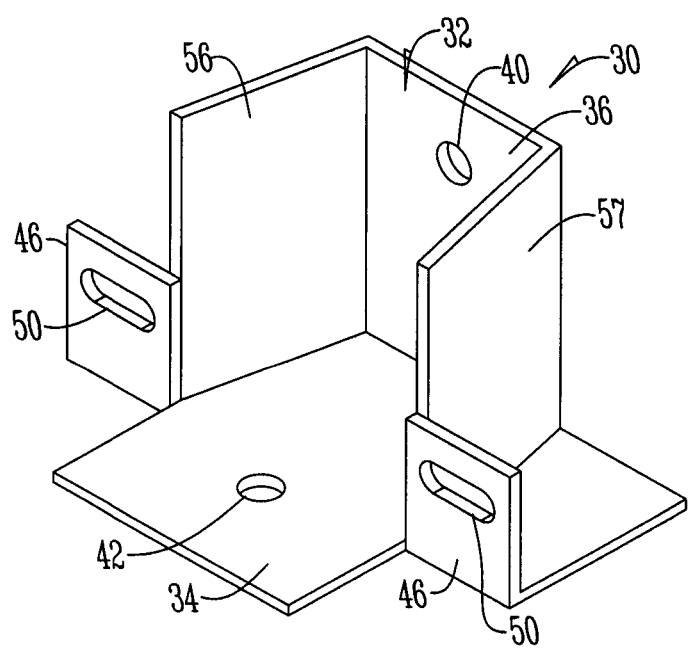
FIG. 5 is a perspective view of a base of a stiffener.

In an alternative design, as shown in FIG. 5, walls 57 are bent in from vertical portion 52 such that walls 57 and vertical portion 52 fit within cavity 22.

To assemble the stiffener 10 and base 30 as shown in FIG. 4, the second section 44 is positioned to fit underneath the elongated body 14. The first section 32 is then placed over the second section 44 such that aperture 40 aligns with aperture 24 of body 14, and aperture 42 aligns with aperture 48. Bolts 58 are used to connect the first section 32 to the elongated body 14 and the second section 44 through the respective apertures.

Therefore, a stiffener and base that is easier to handle and less costly to manufacture has been shown.

It will be appreciated by those skilled in the art that other various modifications could be made to the device without the parting from the spirit in scope of this invention. All such modifications and changes fall within the scope of the claims and are intended to be covered thereby.

What is claimed is:

1. A grain bin support, comprising:
an elongated body having a back surface with at least one aperture; and
a base having a first section having a vertical portion connected to the back surface of the elongated body and a horizontal portion that is placed on and connected to a second section;
the second section having at least one upwardly extending flange connected to a support surface of the elongated body.

2. The support of claim 1 wherein the vertical portion of the base has an aperture that aligns with the aperture on the back surface of the elongated body.

3. The support of claim 1 wherein the horizontal portion of the first section has an aperture that aligns with an aperture on a horizontal portion of the second section.

4. The support of claim 1 wherein the elongated body is bent to form support surfaces that extend outwardly from the back surface.

5. The support of claim 1 wherein the second section has corners that form upwardly extending flanges.

6. A support for a grain bin comprising:
an elongated body having a back surface with at least one aperture;
a base having a vertical portion and a horizontal portion where the vertical portion is secured to the back surface of the elongated body;
the base having at least one upwardly extending flange connected to a support surface of the elongated body.

7. The support of claim 6 wherein the vertical portion has at least one aperture in alignment with the aperture of the back surface.

8. The support of claim 6 wherein the horizontal portion has corners that form upwardly extending flanges.

9. The support of claim 8 wherein the flanges are connected to the elongated body.

10. The support of claim 6 wherein the vertical portion has walls that extend outwardly from the vertical portion.

\* \* \* \* \*